2,914,381

PREPARATION OF RUTILE FROM ILMENITE

Eugene Wainer, Cleveland Heights, Ohio, assignor to Horizons Incorporated, Princeton, N.J., a corporation of New Jersey No Drawing. Application June 8, 1956
Serial No. 590,101

5 Claims. (Cl. 23—202)

This invention relates to a process for beneficiating titaniferous minerals containing various impurities. More particularly it relates to the recovery of relatively pure titanium dioxide, as rutile, from massive ilmenite in which at least about 5% and preferably higher amounts of the iron is in the form of ferrous iron.

Titanium occurs in nature in the form of oxides usually associated with iron or alkaline earth metals. Ilmenite, one of the more common naturally occurring titanium ores, usually contains iron in an amount corresponding approximately to the formula $FeO.TiO_2$. In addition to the iron, ilmenite ores usually have substantial quantities of silica or silicate minerals and pyrites or other sulphur compounds associated with them. By the practice of my invention the titanium dioxide content of the ore is recovered separated from both the siliceous and sulphur-containing gangue.

I have found that when massive ilmenite ore contains at least about 5% of the iron content present as ferrous iron, it may be processed to separate its titanium bearing constituents from the remaining constituents by a relatively simple and direct procedure. As a first step it is necessary to crush the ore to a somewhat coarse product and I have found that ore crushed to between 10 mesh and 65 mesh (Tyler standard) and preferably between 10 and 35 mesh is suitable for the practice of this invention. If the ore is crushed finer, additional unnecessary expense is involved but what is more important, the resulting fine product does not yield a rutile of the desired purity as a result of subsequent treatment by the process about to be described. Ores coarser than 10 mesh (Tyler standard) may be treated in accordance with this invention without any substantial alteration of the process, except that the digestion step may be required to be extended to permit the decomposition of the ore to proceed to practically completion.

Following crushing, the fraction of the crushed ore having the desired particle size is separated from both coarser and finer material in any convenient manner, for example by screening. This fraction of ore of the desired particle size is then digested with hydrochloric acid. Treatments of ilmenite with hydrochloric acid date from at least forty years ago and since that time a wide range of concentrations, temperatures and duration of treatment have been investigated. I have found that when the sized fraction of the crushed ore is subjected to violent agitation while in intimate contact with an amount of concentrated hydrochloric acid stoichiometrically sufficient to react with the iron content of the ore, contact for a period of between one and two days and at a temperature slightly below the boiling point of the liquid phase present, i.e., between 85° and 95° C., is required to leach out substantially all of the iron and the titanium from the sized fraction of massive ilmenite. The iron dissolves in the leach liquor in the form of a mixture of ferric and ferrous chlorides. The titanium is dissolved (possibly as the hydrated chloride) and precipitates almost immediately (as metatitanic acid) leaving as a residue any impurities not affected by the acid treatment. When the ore being treated consists of particles of between 10 and 65 mesh size, treatment with hydrochloric acid as above described has been found to produce a solid product which is readily separated into a fraction containing at least 95% and usually as much as 98% titanium dioxide, and a second fraction in which substantially all of the silica, silicates, and other gangue materials including any pyrites are concentrated.

The gangue materials, that is the silica and pyrites, may be separated from the hydrated rutile by either of two procedures. Thus, in one method the sized ore, after HCl digestion, is filtered hot, screened and washed in a single operation. The solid impurities which are to be separated from the titanium dioxide are retained on a 325 mesh screen and washed with warm water or with dilute hydrochloric acid until free from soluble iron compounds. The filtrate and the washings are combined and the combined filtrate and wash liquors are filtered to separate the very finely divided solid material contained therein which is the desired hydrated rutile. The resulting filtrate consists essentially of a mixture of ferric and ferrous chloride and hydrochloric acid from which the iron and chlorine values may be recovered in any suitable manner. The filter cake when dried or calcined is the desired synthetic rutile product.

In the second method, the sized ore, after HCl digestion, is hot filtered to separate all of the solids from the liquid. The liquid is principally an acid solution of ferrous and ferric chlorides. The filter cake is washed free of soluble iron compounds with warm water or dilute HCl and is then separated into two fractions by screening or by any other physical method. The fraction coarser than 325 mesh contains substantially all of the silica and pyrites and the fraction finer than 325 mesh is the desired titanium dioxide product.

Thus in either of the above procedures, the ultimate separation is preferably effected by wet screening the solid residue through a 325 mesh (Tyler standard) screen or by any other convenient mechanical separation. As a result of this treatment, a milky appearing liquid composed largely of metatitanic acid and small amounts of the impurities in the ore passes through the screen and is recovered separately from the solids retained on the screen. These retained solids comprise a brown and yellowish speckled mixture of most of the silica and substantially all of the pyrites as well as the alumina or aluminates and alkaline earth material present in the ore, together with small amounts of titanium dioxide or undecomposed ilmenite ore.

The milky liquid contains the bulk of the titanium originally present in the ore and now converted to metatitanic acid in finely divided form. The solids in the milky liquid are recoved therefrom by filtration followed by washing and drying of the separated solids. When dried, the recovered titanium dioxide product, identified as rutile, has been found to be well suited to use in the manufacture of titanium metal or to the preparation of a welding flux or indeed for any of the uses for which synthetic rutile is presently produced or for which natural rutile is employed.

The following examples will serve to further point out the novel aspects of my invention but are to be taken as illustrative rather than limitative of my process.

*Example I*

Massive ilmenite of the Ivry-Nord deposit located near Terrebonne in the province of Quebec in Canada, having the following principal constituents (in weight percent) was used in this and the following examples.

| | |
|---|---|
| Fe | 0.1 ⎫ |
| $Fe_2O_3$ | 52.2 ⎬ 38–39% total Fe. |
| FeO | 3.5 ⎭ |
| $TiO_2$ | 31.0 |
| $SiO_2$ | 7.0 |
| S | 1.2 |
| $Al_2O_3$ | 1.5 |

In other samples of the ore, the titania content varied from 30–34%, the silica varied from 2–8%, the sulfur varied from traces to 2%, and the total iron varied from 35–40%.

The ore was crushed and separated into three fractions. The first, coarser than 10 mesh (Tyler standard), was returned for further crushing; the second, finer than 65 mesh, was discarded. The remaining fraction containing ore particles of between 10 and 65 mesh (Tyler standard), was retained for the treatment described below. 1200 parts of the sized ore was treated with 3100 parts by weight of muriatic acid (36% HCl, sp. gr. 1.18) for 24 hours at 90° C. with constant stirring. The resulting slurry was filtered hot and washed with water until the wash water was clear and free of soluble iron. The washed product was then separated into +325 and −325 mesh fractions by wet screening. Milky appearing liquid which passed through the screen contained most of the titanium originally present in the crushed ore. Retained on the 325 mesh screen were 57 parts by weight of a residue comprising essentially all of the silica originally present in the ore, together with pyrites and some undecomposed ilmenite. The milky liquid was filtered through a closely woven cloth filter and the solids separated from the liquid filtrate. The solids recovered were dried, calcined at 1000° C. for three hours and then weighed. The 355 parts obtained corresponded to an over-all yield of 92% of the titanium in the ilmenite. The recovered solids product analyzed as follows:

| | Percent by weight |
|---|---|
| $TiO_2$ | 96.50 |
| $Fe_2O_3$ | 1.47 |
| $SiO_2$ | 0.42 |
| $Al_2O_3$ | 1.50 |
| S | 0.003 |

*Example II*

To illustrate the effect on product quality of processing massive ilmenite which has been crushed to too fine a size, the process of Example I was repeated with 1200 parts by weight of ilmenite crushed to pass a 200 mesh screen. 315 parts by weight of coarser than 325 mesh product were recovered as compared with 57 parts above. The +325 mesh product now contained much more titania than that of Example I. The solids recovered from the filtered, dried −325 mesh portion amounted to 326 parts by weight as compared with 355, and the titanium dioxide product contained much more silica, analyzing:

| | Percent by weight |
|---|---|
| $TiO_2$ | 84.5 |
| $Fe_2O_3$ | 2.2 |
| $SiO_2$ | 10.7 |
| $Al_2O_3$ | 1.5 |
| S | Not determined |

The recovery of titanium was 85%.

*Example III*

Example I was repeated with a slightly coarser ore, the fraction −10 +35 mesh (Tyler standard) being used instead of −10 +65 mesh (Tyler standard). 240 parts by weight of −325 mesh product was obtained with the following analysis:

| | Percent by weight |
|---|---|
| $TiO_2$ | 97 |
| $Fe_2O_3$ | 2.19 |
| $SiO_2$ | None |
| $Al_2O_3$ | 0.7 |
| S | 0.003 |

*Example IV*

Example I was repeated at a lower leaching temperature. 100 pounds of −10 +35 mesh (Tyler standard) ilmenite was treated with 35 gallons of muriatic acid, at 85° C. for 36 hours, with continuing agitation. The resulting product was treated as before to produce a plus 325 mesh discard and a minus 325 mesh dried product. The latter, amounting to 20 pounds, analyzed:

| | Percent by weight |
|---|---|
| $TiO_2$ | 93.4 |
| $Fe_2O_3$ | 2.4 |
| $SiO_2$ | 2.9 |
| S | 0.012 |

In each of Examples I, III, and IV the product satisfied the existing specifications for a synthetic rutile. The product of Example II was not satisfactory because of the excessive content of silica.

*Example V*

To illustrate further the effect of the particle size of the crushed ilmenite on the purity of the product, three batches of crushed ilmenite, each containing 1200 parts of ore by weight were treated as in Example I. The results are tabulated below.

| Particle size | −20 +35 mesh | −35 +65 mesh | −65 mesh |
|---|---|---|---|
| | *Percent* | *Percent* | *Percent* |
| $SiO_2$ in −325 mesh $TiO_2$ product | 0.5 | 2.69 | 11.3 |
| Iron in the −325 mesh $TiO_2$ product | 1.07 | 1.35 | 1.62 |

It will thus be readily apparent that by separating the crushed ore into a fraction consisting of particles coarser than 65 mesh in size and preferably consisting of particles coarser than 35 mesh (Tyler standard) a $TiO_2$ product may be obtained with only minor amounts of siliceous or iron containing impurities.

The foregoing treatments have been described as applied to naturally occurring ores having at least 5% FeO. As will be understood by those skilled in the art, naturally occurring ores in which the ilmenite is in the fully oxidized state may be treated by my process, provided that a substantial proportion of the iron content is reduced to ferrous iron, or even metallic iron. Hence in the following claims it is intended to cover the processing of ilmenites in the partially reduced state, that is, ilmenites with the equivalent of at least 5% of the iron as ferrous iron, whether such ilmenites are naturally occurring or synthetically produced.

I claim:

1. In a process for beneficiating massive ilmenite ores to obtain a product richer in titanium dioxide which includes (1) crushing the ilmenite ore to particles coarser than 65 mesh and finer than 65 mesh; (2) dissolving iron present in the crushed ore by digesting the crushed ore with a concentrated solution of hydrochloric acid at a temperature between about 85° C. and the boiling point of the solution for between about one and two days; (3) agitating the ilmenite while it is being treated with the acid; (4) separating the resulting product into a liquid portion and a solid portion and (5) recovering the titanium dioxide in said solid portion; the improvements which comprise: removing the fraction finer than 65 mesh, Tyler standard, from the crushed ilmenite prior to treatment with HCl; separating solids coarser than 325 mesh from the acid-treated material, leaving as a solid product, hydrated rutile finer than 325 mesh, Tyler standard, and substantially free of the silica and pyrites initially present in the crushed ilmenite and recovering the solid hydrated rutile.

2. In a process for beneficiating massive ilmenite ores to obtain a product richer in titanium dioxide which includes (1) crushing the ilmenite ore to particles coarser than 35 mesh and finer than 35 mesh; (2) dissolving iron present in the crushed ore by digesting the crushed ore with a concentrated solution of hydrochloric acid at a temperature between about 85° C. and the boiling point of the solution for between about one and two days; (3) agitating the ilmenite while it is being treated with the acid; (4) separating the resulting product into a liquid portion and a solid portion and (5) recovering the titanium dioxide in said solid portion; the improvements which comprise: removing the fraction finer than 35 mesh, Tyler standard, from the crushed ilmenite prior to treatment with HCl; separating solids coarser than 325 mesh from the acid treated material, leaving as a solid product hydrated rutile finer than 325 mesh, Tyler standard, and substantially free of the silica and pyrites initially present in the crushed ilmenite, and recovering the solid hydrated rutile.

3. In a process for beneficiating massive ilmenite ores to obtain a product richer in titanium dioxide which includes (1) crushing the ilmenite ore to particles coarser than 65 mesh and finer than 65 mesh; (2) dissolving iron present in the crushed ore by digesting the crushed ore with a concentrated solution of hydrochloric acid at a temperature between about 85° C. and the boiling point of the solution for between about one and two days; (3) agitating the ilmenite while it is being treated with the acid; (4) separating the resulting product into a liquid portion and a solid portion and (5) recovering the titanium dioxide in said solid portion; the improvements which comprise: (a) removing the fraction finer than 65 mesh, Tyler standard, from the crushed ilmenite prior to treatment with HCl, (b) separating solids coarser than 325 mesh from the acid-treated material, leaving as one separated product solid hydrated rutile finer than 325 mesh, Tyler standard, and substantially free of the silica and pyrites initially present in the crushed ilmenite in an acid solution of iron chlorides; (c) separating the minus 325 mesh solid product from the accompanying liquid phase; and (d) recovering the solid hydrated rutile product obtained in said separation.

4. In a process for beneficiating massive ilmenite ores to obtain a product richer in titanium dioxide which includes (1) crushing the ilmenite ore to particles coarser than 65 mesh and finer than 65 mesh; (2) dissolving iron present in the crushed ore by digesting the crushed ore with a concentrated solution of hydrochloric acid at a temperature between about 85° C. and the boiling point of the solution for between about one and two days; (3) agitating the ilmenite while it is being treated with the acid; (4) separating the resulting product into a liquid portion and a solid portion and (5) recovering the titanium dioxide in said solid portion; the improvements which comprise: removing the fraction finer than 65 mesh, Tyler standard, from the crushed ilmenite prior to treatment with HCl; separating solids from the liquid phase present in the acid treated material, leaving a solid consisting of hydrated rutile finer than 325 mesh and a solid product coarser than 325 mesh which consists essentially of the silica and pyrites initially present in the crushed ilmenite, and separating and recovering the minus 325 mesh solid rutile product separately from the plus 325 mesh impurities.

5. In a process for beneficiating massive Ivry-Nord ilmenite ores to obtain a product richer in titanium dioxide which includes (1) crushing the ilmenite ore to particles coarser than 65 mesh and finer than 65 mesh; (2) dissolving iron present in the crushed ore by digesting the crushed ore with a concentrated solution of hydrochloric acid at a temperature between about 85° C. and the boiling point of the solution for between one and two days; (3) agitating the ilmenite while it is being treated with the acid; (4) separating the resulting product into a liquid portion and a solid portion and (5) recovering the titanium dioxide in said solid portion; the improvements which comprise: removing the fraction finer than 65 mesh, Tyler standard, from the crushed ilmenite prior to the treatment with HCl; and: filtering the digestion mixture to separate the liquid phase therein from the solids present; and wet-screening the separated solids to remove a fraction coarser than 325 mesh and containing substantially all of the silica and pyrites initially present in the ore and leaving as a solid product hydrated rutile finer than 325 mesh, Tyler standard, and substantially free of the silica and pyrites initially present in the crushed ilmenite.

References Cited in the file of this patent

UNITED STATES PATENTS

| | | |
|---|---|---|
| 1,325,561 | Farup | Dec. 23, 1919 |
| 1,939,119 | Holt et al. | Dec. 12, 1933 |
| 2,088,913 | Llewellyn | Aug. 3, 1937 |

OTHER REFERENCES

Perry: Chemical Engineer's Handbook, 3rd, pages 995, 957 and 963, published 1950 by McGraw-Hill Book Co., Inc., N.Y.